US011036821B2

(12) United States Patent
Garg et al.

(10) Patent No.: US 11,036,821 B2
(45) Date of Patent: Jun. 15, 2021

(54) ABILITY TO BROWSE AND RANDOMLY ACCESS A LARGE HIERARCHY IN NEAR CONSTANT TIME IN A STATELESS APPLICATION

(71) Applicant: Oracle International Corporation, Redwood Shores, CA (US)

(72) Inventors: Anurag Garg, Cupertino, CA (US); Jeffrey Leon Woodard, Winter Garden, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/367,087

(22) Filed: Mar. 27, 2019

(65) Prior Publication Data

US 2020/0050648 A1 Feb. 13, 2020

Related U.S. Application Data

(60) Provisional application No. 62/715,563, filed on Aug. 7, 2018.

(51) Int. Cl.
*G06F 3/048* (2013.01)
*G06F 16/957* (2019.01)
*G06F 9/451* (2018.01)
*G06F 16/22* (2019.01)
*G06F 3/0482* (2013.01)
*G06F 3/0485* (2013.01)

(52) U.S. Cl.
CPC ........ *G06F 16/9574* (2019.01); *G06F 3/0482* (2013.01); *G06F 3/0485* (2013.01); *G06F 9/452* (2018.02); *G06F 16/2246* (2019.01)

(58) Field of Classification Search
CPC ............. G06F 16/9027; G06F 16/2246; G06F 16/9574; G06F 9/452; G06F 3/0482; G06F 3/0485; G06F 9/451; G06F 16/904
See application file for complete search history.

(56) References Cited

U.S. PATENT DOCUMENTS

| | | | | |
|---|---|---|---|---|
| 7,353,464 B1 * | 4/2008 | Kundu | ................ | G06F 16/2423 715/853 |
| 2012/0218289 A1 * | 8/2012 | Rasmussen | ........... | G06F 3/0482 345/619 |
| 2016/0321287 A1 * | 11/2016 | Luthra | ................ | G06F 16/9574 |
| 2017/0154122 A1 * | 6/2017 | Sun | ..................... | G06F 21/6218 |

* cited by examiner

*Primary Examiner* — Alex Olshannikov
(74) *Attorney, Agent, or Firm* — Invoke

(57) ABSTRACT

A browser is disclosed that provides for browsing a hierarchical dataset including potentially millions of nodes. The hierarchical dataset may be located on a machine that is remote to the machine hosting the browser. Through selective, intelligent fetching and local cache management of sparse portions of the hierarchical dataset, the browser provides consistent and predictable response times for displaying a randomly-selected node in the context of proximate nodes in the hierarchy.

20 Claims, 5 Drawing Sheets

ABILITY TO BROWSE AND RANDOMLY ACCESS A LARGE HIERARCHY IN NEAR CONSTANT TIME IN A STATELESS APPLICATION

INCORPORATION BY REFERENCE

This application claims priority to provisional application No. 62/715,563 filed on Aug. 7, 2018, and entitled "Ability to Browse and Randomly Access a Large Hierarchy in Near Constant Time in a Stateless Application," the disclosure of which is incorporated by reference herein in its entirety.

TECHNICAL FIELD

The present disclosure relates to various techniques for browsing hierarchical data. Specifically, this disclosure is directed to efficiently improving response times for displaying a randomly selected small subnet of nodes from a very large hierarchy of nodes.

BACKGROUND

There are several approaches for browsing data maintained by a remote machine. When browsing small sets of remote data, the browser may be able to download and cache the entire dataset at the beginning of browsing so that no further data retrieval is necessary during the browsing session. However, with datasets having on the order of a million entries, the entire dataset may be too large to fit in a local cache. Even if the dataset fits in a local cache, retrieving the entire data set when only a small portion of the dataset is to be accessed may be inefficient. A common approach of loading data only as the user scrolls down doesn't allow any area of the hierarchy to be displayed without first loading all prior nodes.

Fetching and cache management strategies may be used to access data stored locally that has been retrieved from remotely stored datasets. In one example, a browser provides a scrolling interface for browsing "linear" data. "Linear data" as used herein refers to data items that have a relative ordering (such as chronological, alphabetical, or numerical). The relative ordering indicates which data items are immediately next to other data items. The lists of data are displayed according to that relative order.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

Figure 1A:
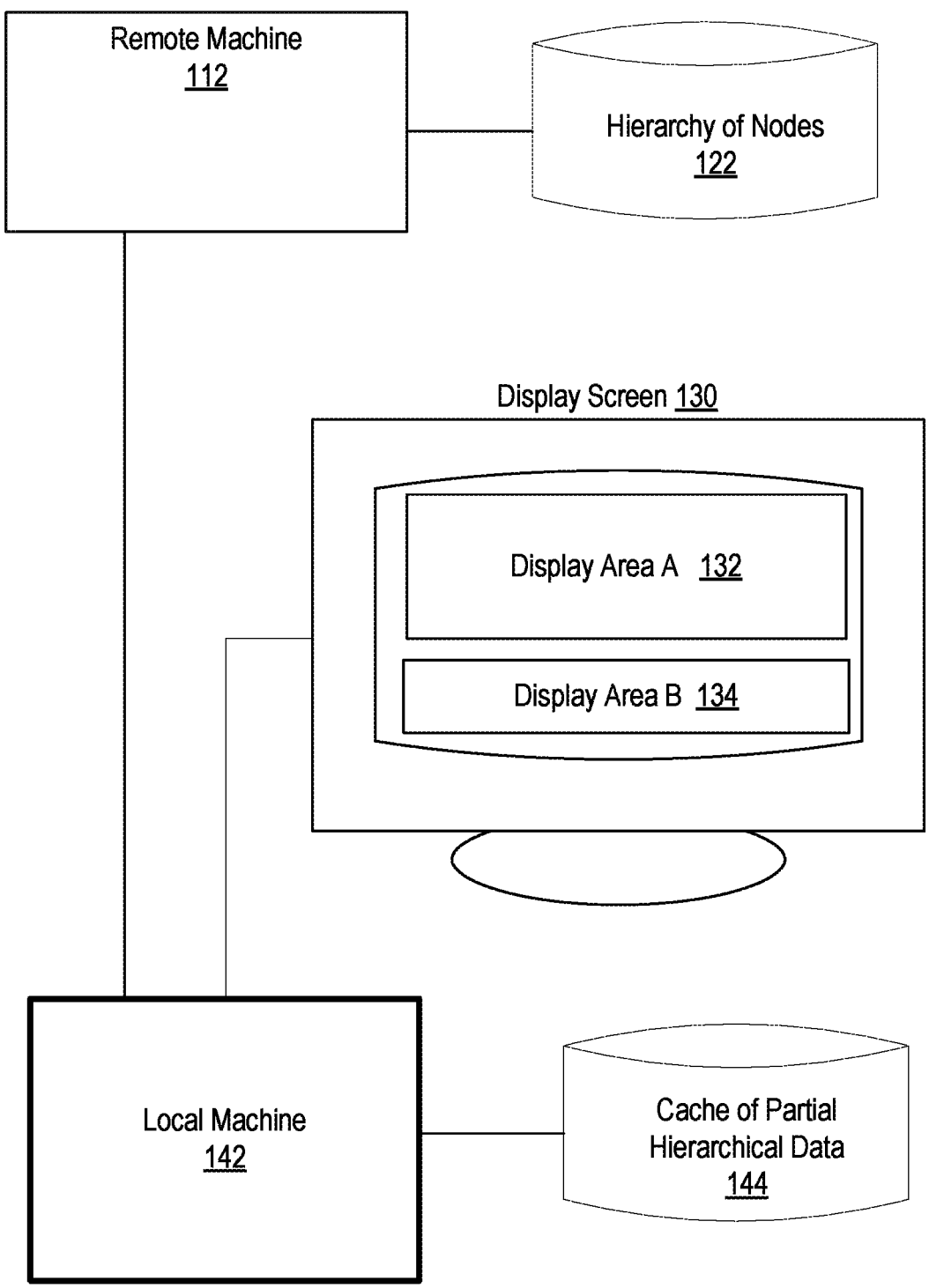
FIG. 1A is a block diagram that illustrates components of the system, in accordance with one or more embodiments.

Components in block diagrams and operations in flow diagrams may be added, removed, modified, or combined. Functionality described in relation to one component/operation may instead be implemented by another component/operation. Accordingly, the specific components/operations illustrated and/or described herein should not be construed as limiting the scope of any of the claims.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

A large hierarchical data set may be visually represented by thousands or even millions of nodes. A system, displaying a visual representation (e.g., nodes) corresponding to the hierarchical data, may be implemented remotely from a datastore that includes the hierarchical data. One or more embodiments aim to present requested nodes corresponding to a subset of the hierarchical data without any significant lag time, as though the hierarchical data is locally stored even though the hierarchical data is remotely stored.

The system fetches nodes that are to be displayed rather than fetching all nodes representing the entirety of the hierarchical data. As an example, an interface displays a section of the visual representation and allows a user to scroll toward a particular non-displayed section of the visual representation. Based on the scrolling, the particular non-displayed section corresponds to nodes that are now to be displayed. As another example, an interface allows a user to identify an individual node (i.e., by random access) in the hierarchy that is not shown in the display and not within reasonable scrolling distance of the currently-displayed data. Upon receiving the user-specified node, the specified node and nodes related to the specified node are displayed.

Subsequent to and responsive to detecting user input that causes nodes to be displayed that are not currently displayed, the system fetches the nodes corresponding to the particular non-displayed section without fetching nodes corresponding to the entirety of the hierarchical data. Identifying and fetching a subset of nodes to be displayed is quick in comparison to fetching all the nodes of the visual representation corresponding to the entirety of the hierarchical data. The speed at which the subset of nodes is fetched and displayed may be sufficiently similar from a user perspective to the speed at which locally stored nodes are displayed in response to a user request.

In addition to fetching the nodes to be displayed, one or more embodiments pre-fetch additional nodes that are related to and/or adjacent to the set of nodes to be displayed While the initial user input does not result in display of the additional nodes, further user input (e.g., scrolling from the initial display of the particular node and the set of nodes displayed with the particular node) may result in display of the additional adjacent nodes. Fetching the additional adjacent nodes without fetching the entire set of nodes is efficient while allowing for, if requested, a quick presentation of the additional adjacent nodes.

Some embodiments described in this Specification and/or recited in the claims may not be included in this General Overview section.

2. Architecture for Browsing Hierarchical Data

A tree browser may allow a user to browse hierarchical data. In an embodiment in which nodes from a hierarchy are displayed in an ordered sequence in a display window, the ordered sequence is determined by traversing the hierarchy in a particular search order. For example, in an embodiment the ordered sequence may be generated by following these rules starting with a particular node A in the hierarchy:

(a) start with an empty sequence, and start at a particular node in the hierarchy, such as node A.

(b) add the particular node to the sequence.

(c) if the particular node has one or more child nodes and the particular node is in an expanded state then:

(d) perform steps (b) and (c) for each of the child nodes of the particular node in order of the child nodes. (This is a recursive algorithm in which a child node becomes the particular node when performing steps b and c).

The ordering produced by these rules results in a linearization of the hierarchy similar to the way many file system contents are displayed to a user, with the containing folder or directory first, then a list of contents in the directory including files and other directories.

The nodes in the ordered sequence may be affected by an expansion status of a node. When a parent node is expanded, the child nodes of that parent node appear in the ordered sequence of nodes, and when the parent node is collapsed, the child nodes do not appear.

In addition to scrolling through an ordered list of data representing a hierarchy (tree) of nodes, a tree browser may also allow for a user to expand or collapse a node of the tree. When a user expands a node in the display, the display changes by inserting child nodes into the ordered list shown in the display. Inserting nodes in the middle of the displayed list may push nodes, appearing toward the bottom of the list, off the bottom end of the display. The position of a node displayed to a user relative to other nodes on a screen may change based on the expansion of nodes in the hierarchy. Thus, the set of nodes to be displayed depends on the expansion state of nodes related to the particular node.

A hierarchical data browser may fetch data from a remote machine that includes all the nodes in a subtree of the hierarchy, then only display nodes requested by the user. That is, a fully expanded subtree may be fetched.

FIG. 1A is a block diagram that illustrates components of the system, in accordance with one or more embodiments. Components may be omitted, modified, rearranged, combined, or otherwise modified.

Hierarchy of Nodes 122 represents a very large dataset of hierarchical data that is browsed. The nodes in the hierarchy are sent upon request to a Local Machine 142 that hosts users browsing the data. The hierarchy contains the nodes but does not necessarily include additional state information to track which data is being browsed or cached by potentially multiple browsing machines.

Remote Machine 112 manages the hierarchy of nodes 122. Requests for nodes are received by remote machine 112 to fetch data from the hierarchy of nodes 122 and send the data to the requesting machine such as local machine 142. The remote machine 112 may be stateless with regard to the data being requested. That is, the remote machine 112 does not maintain a record of past requests. The request for data to the remote machine 112 is idempotent.

Display Screen 130 is a screen of a display device communicatively coupled to the local machine 142. Display area 132 is a display window in a region of the display screen 130 in which an ordered list of data items of the hierarchical tree nodes are displayed and browsed. The ordered list of data items includes a number of data items according to the number of lines of data that can be displayed simultaneously in the display window.

Display Area 134 is a separate portion of the screen that may display meta data for the nodes displayed in Display Area 132. Examples of metadata that may be displayed in Display Area B include an ordered list of ancestor nodes in the hierarchy for a selected node. Other information that may be displayed in Display Area B include attributes of a selected node such as value and type, creation time, owner, etc. A search interface may be displayed in Display Area 134.

Local Machine 142 hosts a browser used by a user to browse the data in the hierarchy of nodes 122. A user views nodes in display area 132 and may navigate by scrolling to other nodes in an ordered list of nodes. As new nodes are scrolled to in the display window, the local machine may request that remote machine 112 send the to-be-displayed nodes to local machine 142 so that the nodes can be displayed in display area 132. A user may interact with display area 134 to specify a target node for viewing when the node is not within convenient scrolling distance from the nodes shown in display area 132. For example, display area 134 may contain a list of bookmarked nodes, recently viewed nodes, or a search bar in which the name of the target node may be specified. In response to the user requesting to view a particular target node, local machine 142 may determine which nodes are to be displayed next to the target node and may fetch those additional nodes from remote machine 112 as needed.

Cache of Partial Hierarchical Data 144 is a cache local to, and managed by, local machine 142. Local machine 142 stores copies of a subset of the nodes in the hierarchy of nodes 122 as the nodes are fetched from the remote machine. For every requested node in the local cache, the cache may include copies of ancestors, siblings, descendants, or other types of related nodes as specified in a policy. As an example, for every requested node in the local cache, the cache may include all ancestors of the requested node, but the cache may not necessarily include all the sibling nodes of the requested nodes. In another example, for every requested node in the local cache, the cache may include ancestor nodes up to n levels up and all the sibling nodes of the requested nodes. In addition to the data in the nodes that are copied in the cache, cached nodes may also include additional metadata that tracks the browsing state of the data in the browser. This metadata may not be known to the remote machine storing the master hierarchical dataset. For example, each internal node (that is, nodes having at least one child node) may have an associated expansion status indicator. The expansion status indicates whether child nodes of an internal node are to be displayed. In an embodiment, cache of partial hierarchical data 144 may also store a list of nodes for which the expansion status is expanded. This list of expanded nodes may be separate from the cached nodes, and the list may persist in the cache even when a node in the list may be evicted from the cache. In an embodiment, the expanded node list may include only those nodes that have been cached at least once during the browsing session and whose expansion status is expanded. Nodes that have not yet been cached during the browsing session and nodes having a collapsed status may not be in the list. Alternatively, the list of expanded nodes may be further restricted to only include nodes that have been evicted by the cache having an expanded status. In such an embodiment, a node may be added to the list of expanded nodes when an expanded node is evicted from the cache. When a node that has been previously evicted from the cache is re-fetched and entered into the cache, its expansion status may be set to expanded if the node appears in the list of nodes with expansion status. In an embodiment, a node may be removed from the list of expanded nodes when the node is stored in the cache, because the node's expansion state is stored within the cached node itself.

In an embodiment in which the nodes of the hierarchy are ordered according to the linearization rules described above, child nodes of a particular expanded internal node may appear in an ordered list of nodes before a sibling node of the particular internal node. However, if the particular node has an expansion status of "collapsed", the sibling node may appear immediately after the particular node without intervening child nodes.

Some of the nodes in the hierarchy of nodes 122 may not have corresponding copies in the cache. A placeholder may be used to represent a set of contiguous ordered nodes to indicate that the master hierarchy includes nodes that are not represented in the cache. When traversing the cached hierarchy for nodes to display in an ordered sequence, encountering a placeholder may cause the local machine to request copies of the missing nodes and to enter the fetched nodes into the cache.

Figure 1B:
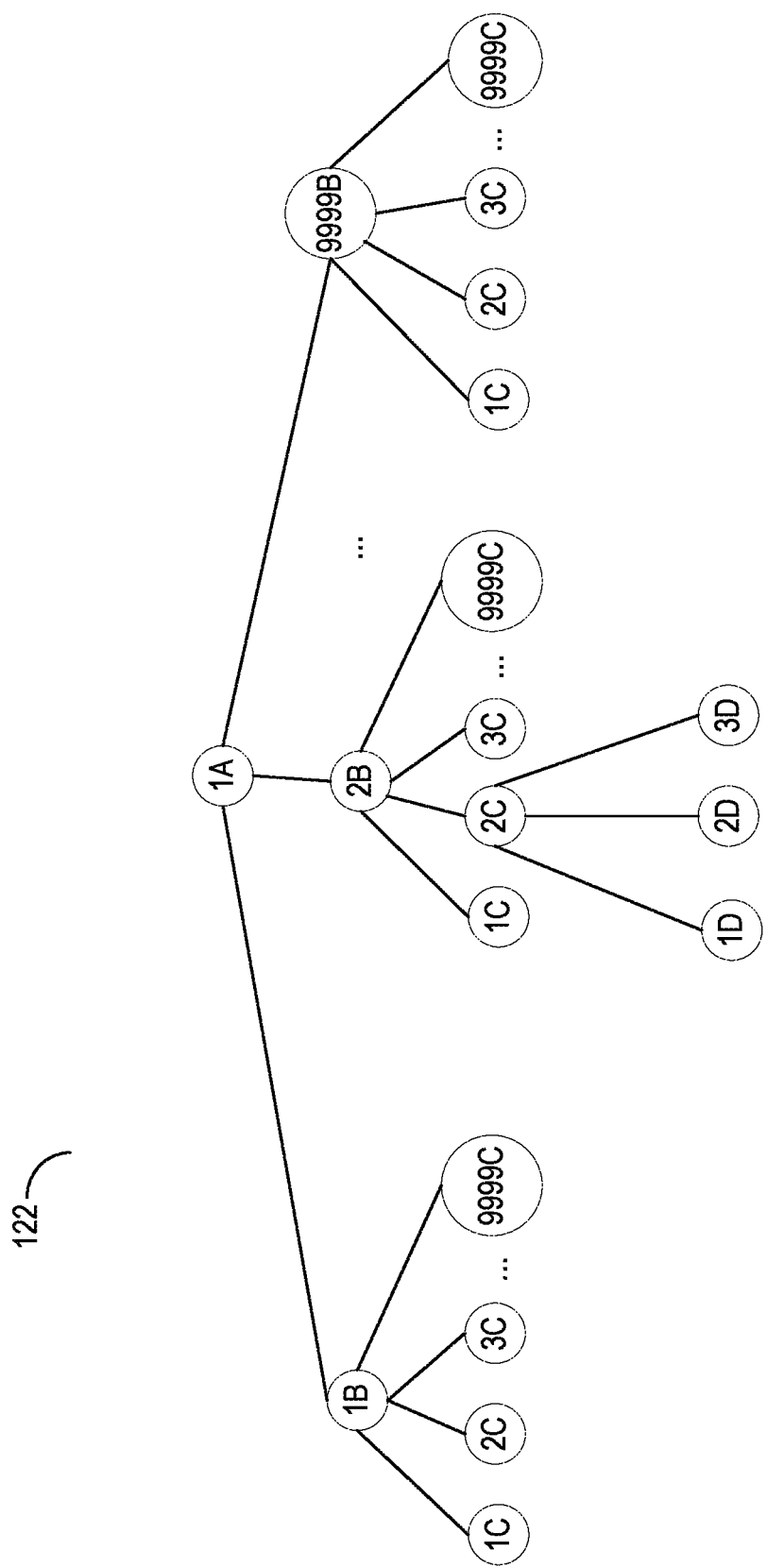
FIG. 1B illustrates Hierarchy of Nodes 122 in more detail, in accordance with one or more embodiments.

FIG. 1B illustrates Hierarchy of Nodes 122 in more detail, in accordance with one or more embodiments. The labels of the nodes in the hierarchy are selected, in the illustrated example, to facilitate identifying nodes. The illustrated example should not be construed to limit the scope of any of the claims. Each node has a unique identity when using the labels of its ancestors as a prefix. For example, the number in the node is an indication of the order of sibling nodes. Thus, a node with "1" is the first sibling node and a node with "2" is the second sibling node. The letter in the node indicates the level in the hierarchy. Thus, node 1B is a descendent of node 1A. Node 1A is the root of the hierarchy, and has 9999 child nodes in order {1B, 2B, . . . , 9999B}. The ellipses in the diagram indicate nodes that exist in the hierarchy, but representation has been left out of the diagram for lack of space. For example, node 1B has child nodes 4C, 5C, 6C etc., but child nodes 4C, 5C, 6C, etc. are not depicted in the figure. Nodes 1B, 2B, and 9999B each have 9999 child nodes as well. This hierarchy has a very large number of nodes.

Figure 1C:
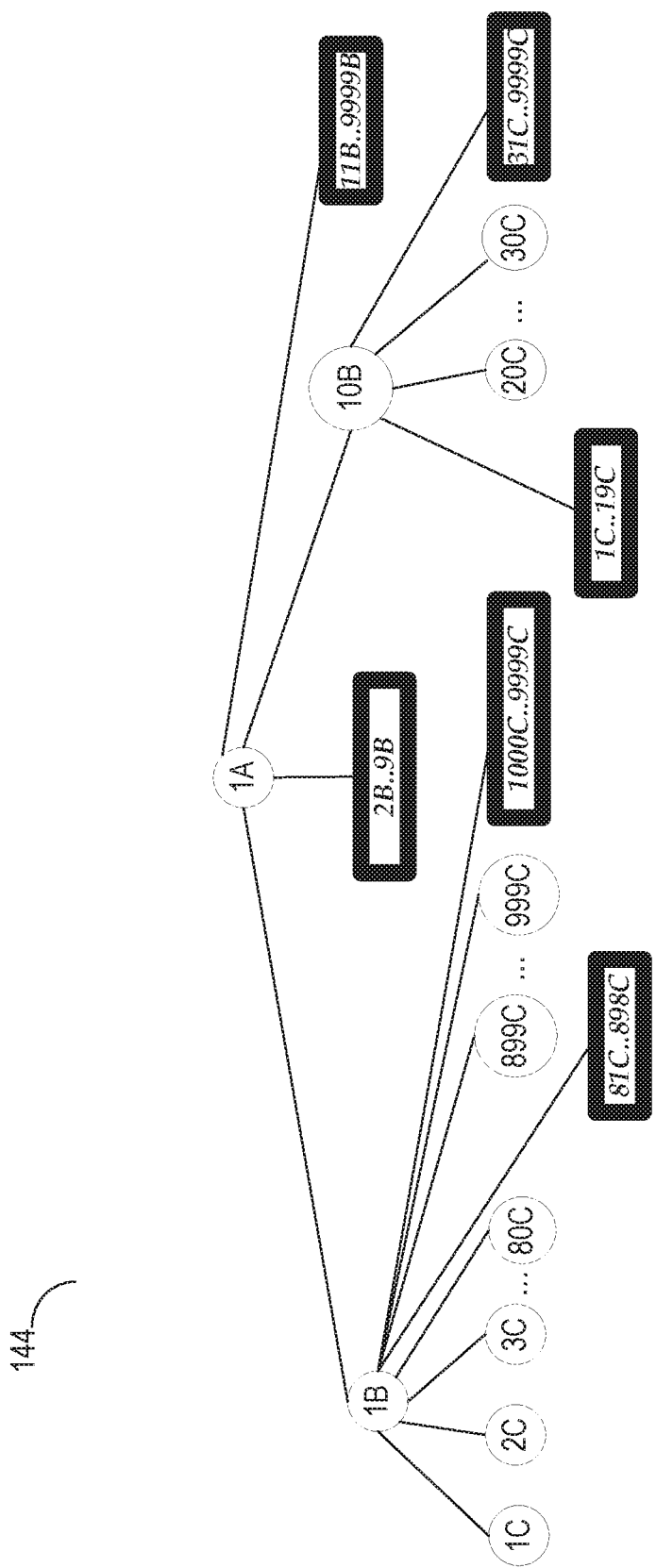
FIG. 1C illustrates a local cache of nodes corresponding to nodes in the hierarchical tree of data illustrated in FIG. 1B, in accordance with one or more embodiments.

FIG. 1C illustrates a local cache of nodes corresponding to a subset of the nodes in the hierarchical tree of data illustrated in FIG. 1B, in accordance with one or more embodiments. Labeled nodes indicate copies of the corresponding nodes in the hierarchy of FIG. 1B, and the thick bordered rectangles represent placeholders. The placeholder identifies a set of one or more sibling nodes that are contiguous in the ordered list of sibling nodes and that are not cached. For example, the entire subtree of 2B is not stored in the cache. Also missing from the cache are:

child nodes of node 1B: {81C through 898C} and {1000C to 9999C} and
child nodes of 10B: {1C to 19C} and {31C to 9999C}

Figure 2:
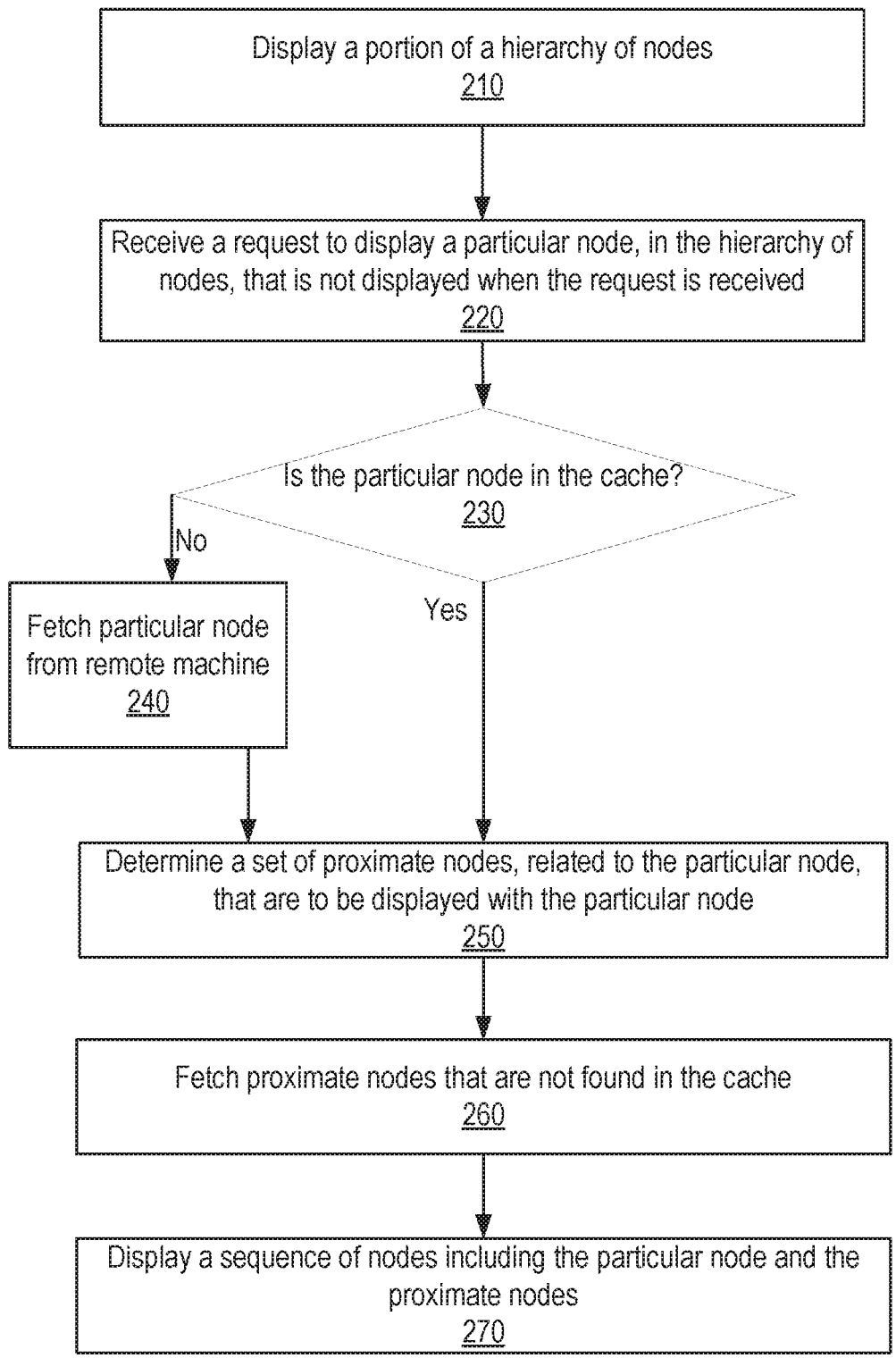
FIG. 2 is a flow diagram that illustrates retrieving and displaying a target node, in accordance with one or more embodiments.

FIG. 2 is a flow diagram that illustrates retrieving and displaying a data item of a target node, in accordance with one or more embodiments. In Operation 210, an ordered sequence of nodes that is a portion of the hierarchy of nodes 122 is displayed in display area 132. The display window can present a certain number of lines of data items. In an embodiment, the local machine may pre-fetch some portion of the hierarchy for display in display area 132 at startup time, before Operation 210 is performed.

In Operation 220, the user may request to view a particular node in the hierarchy that is not shown in the display window, and thus, cannot be selected from display area 132. A user may choose the option of using display area 134 to select a node for display in display area 132 when the node of interest is not within reasonable scrolling distance of the nodes shown in the display window. In other words, the target node of interest may be located in a subtree that is far away in the hierarchy from the displayed nodes. A target node may be specified by interacting with display area 134 to select a bookmarked node, a recently viewed node, or entering a node name in a search bar to navigate directly to the target node without needing to scroll.

In Operation 230, the local machine may search for the target node in the local cache. If the target node is not stored in the local cache, then in Operation 240, the local machine may request a copy of the target node from remote machine 112 and store the copy of the target node in the cache. In addition, ancestors of the target node that are not already in the cache may be fetched and placed in the cache.

The hierarchy of cached nodes is used to determine the data items to display in display area 132 in Operation 250 in response to a user request. The data items to be displayed may include an ordered sequence of nodes. In an embodiment, the data item for the target node may be placed approximately in the center of the display window. The number of data items for the nodes to be displayed with the target node may be based on a display configuration. The display configuration may include, for example, the size of the display window, the resolution of the display window, the size of each illustration of a node, the amount of space between nodes. Some of the nodes to be displayed may be missing in the cache, and instead represented by placeholders in the cache. Identifying the data items to be displayed is discussed in further detail in the section below, titled "IDENTIFYING NODES TO BE DISPLAYED."

In operation 260, nodes that are determined to be needed for display, but which are missing from the cache, may be fetched from the remote machine 112. As nodes are received from the remote machine, the nodes may be added to the cache and placeholders removed or revised to indicate the smaller set of nodes that are missing.

In Operation 270, the nodes to be displayed, including the target node, are displayed in display area 132. For example, referring to FIG. 1C, if node 899C is selected for display, information about nodes represented by the placeholder may be needed. For example, node 898C is missing from the cache. Node 898C would have to be fetched from the remote machine. Thus, when nodes from the ordered sequence of nodes to display are missing from the cache, Operations 230 through 260 may have to be repeated until the number of nodes in the ordered sequence fills the display window.

3. User Interface Considerations

The browser may support a user's ability to request a single operation to expand or collapse (a) an individual node or (b) all nodes.

The expansion state of a node entering the cache may be set to a default value. In an embodiment, the default expansion state is not expanded (also referred to herein as collapsed). A user may request expansion of a node by choosing (e.g. clicking on) the node in the display window. When a user chooses an individual node to be expanded, the node's expansion state indicator value may be set to expanded, and the child nodes of the selected node may be added into the displayed list of nodes. The expansion state indicator may remain as expanded until the user requests the node to be collapsed.

Selecting a node that is randomly accessed through a search interface or other means that do not include choosing from within the display window may cause the value of the expansion state indicator for all ancestors of the selected node to be set to an expanded state. The displayed list of nodes appear to the user as though the user manually expanded all of the ancestor nodes and scrolled to the selected node.

In an embodiment, a user may request to expand all, which changes the expansion state of all nodes in the hierarchy to expanded. Upon expanding all nodes in the hierarchy, the browsing state may be changed for all nodes, not only the nodes that are being displayed or cached at the time the request is made. In an embodiment, a global expansion state indicator may indicate whether all nodes are to be displayed as expanded. If the global expansion state indicator indicates expansion mode, every node is displayed as though its state is expanded regardless of the value of the node's individual expansion state identifier value.

In an embodiment, a user may request to expand down, which may change the expansion state of all nodes in the subtree rooted at the chosen node to be expanded. In an embodiment, a subtree expansion indicator may be stored in the cache that identifies the node that is the root of the subtree to be expanded. To determine whether a node to be displayed should be expanded, the system may consult the subtree expansion indicators to determine whether the node is in the subtree of any of the nodes identified by the subtree expansion indicators.

Similarly, the user may request to collapse all, which may cause all nodes to become collapsed. The expansion state indicator may be set to collapsed, and a list of individual expanded nodes may be emptied. In an embodiment, subtree expansion indicators may be deleted.

4. Identifying Nodes to be Displayed

In an embodiment, the system identifies the nodes to be displayed based on a requested node. The nodes to be displayed represent a particular section of the hierarchical tree of nodes that is to be displayed. A section of the hierarchical tree of nodes, as referred to herein, may include any contiguous or non-contiguous set of nodes in the hierarchical tree of nodes.

A requested node is generally displayed with nodes that are directly or indirectly related to the requested node. As an example, in response to a request for a particular node, the particular node may be illustrated in the center of a display. The system may be configured, by default to display up to five ancestors of the requested node, two siblings of the requested node, and no descendants. The five ancestor nodes may be determined by traversing up to five levels from the requested node in the hierarchical tree of nodes. The two siblings may be determined based on the position of the requested node in an ordered sequence of siblings. The two nodes following the requested node in an ordered sequence of siblings may be identified as the siblings to displayed. Displaying no descendants initially means that the system is configured to initially display requested nodes in a collapsed state. An alternate configuration may display requested nodes in an expanded state. As an example, the first x descendants in an ordered sequence of descendants of the requested node may be included with an initial display of the requested node.

In an embodiment, the system identifies the nodes to be displayed when a particular displayed node is expanded. In response to the request to expand a particular node, the system determines the number of descendant nodes that are to be displayed. As an example, the system may be configured to initially display the first four descendant nodes without displaying other descendant nodes of the expanded node. A display of the other descendant nodes may be triggered by a user scrolling down the list of descendant nodes.

In an embodiment, each node of the hierarchical tree of nodes may be displayed on a separate horizontal line of the display. A user may scroll down to nodes earlier in the ordered list of nodes not previously displayed or may scroll up to see nodes later in the ordered list that were not previously displayed. Responsive to detecting the scrolling, the system may identify one or more nodes to be added to the display as well as one or more nodes to remove from the display because the nodes no longer fit on the display.

The nodes to be displayed, as explained above, are limited to a specific number of nodes based on a configuration associated with a display window. As an example, the number of nodes that can be displayed in a window may be a function of a size and/or resolution of the window, a size of an icon representing each node within the window, a font size of a node identifier, and a spacing between nodes. The system may determine, for example, that ten nodes can be displayed with a requested node. Based on a priority and/or policy, the system may select ten nodes, of the nodes related to the requested node, as the to-be-displayed nodes.

In an embodiment, the approach described herein efficiently creates an ordered list of nodes to fill a display window having a particular node in the ordered list considering the expansion status of internal nodes in the hierarchy. The particular node may be placed in the center of the display window, though any position within the display window may be selected. A basic approach to creating the ordered list of nodes to display would be to express the entire hierarchy as an ordered list based on the expansion status of each node. The entire hierarchy may be searched in a pre-defined order, treating unexpanded internal nodes as though the internal nodes were leaf nodes. In other words, when a node that is a root of a subtree is not expanded, the subtree is not searched (and child nodes of the subtree root are not included in the list). The particular node may be located in the list ordered list, and a number of nodes before the particular node in the list, and a number of nodes after the particular node in the list, may be selected for display. When the particular node is to appear in the center of the display window, the number of nodes before and after the particular node may be roughly half of the maximum number of lines in the display window. However, in a hierarchy of millions of nodes, creating an ordered list for the entire hierarchy may be prohibitively time consuming, especially if the user has chosen to "expand all" nodes.

A more efficient approach to create the ordered list is to first search the subtrees closest to the particular node in the hierarchy, and to expand the search to further relatives only as needed to fill the display list. In an embodiment, the hierarchy may be searched in an order corresponding to the desired order of data items to display starting with the immediate parent node of the particular node. As explained earlier, the parent node may be expanded because the particular node is to be displayed. If there are enough sibling nodes of the particular node to fill the ordered list, then no further search is needed. If the number nodes in the ordered list created by exploring the immediate parent node does not fill the display list, then the search may be performed on the grandparent node, and so on until the ordered list includes a sufficient number of nodes to fill the display window.

In an embodiment, two separate ordered lists may be created: one list to display before the particular node and one list to display after the particular node. Each list may be formed by searching a different subtree. For example, if the particular node is the last of a set of ordered sibling nodes, then the list of nodes to display after the particular node may come from searching a different (aunt/uncle) subtree rather than from exploring the particular node's parent node.

5. Working with Placeholders

Creating the ordered list as described above may be performed using the portions of the hierarchy in the local cache. While searching and ordering nodes of a subtree, a placeholder may be encountered that indicates a contiguous set of child nodes that exist but are not in the cache. To complete the search, at least a portion of the nodes represented by the placeholder may be fetched from the remote machine, added to the cache, and the placeholder may be removed or altered before the search continues. In an embodiment, all the nodes represented by a placeholder may be fetched, and the placeholder may be removed entirely. In an embodiment, a portion of the nodes represented by the placeholder may be fetched in the which the number of fetched nodes does not exceed: (a) a pre-fetching limit or (b) the number of nodes in the ordered list that can be displayed. The placeholder may be updated to represent the nodes that have not yet been fetched.

In an embodiment, if a user selects a node to display by entering an identifier of the selected node in a search interface, the selected node may reside in a subtree that has not yet been cached and/or expanded. Thus, when a selected node is randomly accessed, each of the ancestor nodes' expansion status may be set to expanded. Child nodes that were recently expanded, but not yet represented in the cache, may be fetched and cached or may be represented by a placeholder until those child nodes are determined to be needed for display.

When the cache runs out of space, nodes in the cache may be selected for eviction according to a cache management policy, and the node selected for eviction may be replaced by a placeholder in the cached hierarchy.

6. Fetching Nodes from the Remote Machine

When at least one node needs to be retrieved from the remote machine, the number of nodes to fetch may depend on several factors. The minimal number of nodes to retrieve is the number of nodes that are needed to fill the display list. This minimal number of nodes are the nodes to be displayed as explained above, in section 4, titled "identifying nodes to be displayed." If a group of contiguous nodes are missing, all of the nodes in the group of contiguous nodes may be fetched in the same request. However, if a group of nodes are needed to fill the display list, and the nodes are not contiguous in the ordered list, the local machine may request a number of contiguous nodes that includes at least one node that needs to be fetched. The number of contiguous nodes to be fetched may be determined as a function of the number of nodes that can be simultaneously displayed in the display window. For display purposes, the number of nodes needed in the ordered sequence does not exceed the number nodes that can be simultaneously displayed the display window. Fetching contiguous nodes, some already cached, may be more efficient than sending individual requests for non-contiguous placeholders within a common subtree.

In addition, the number of nodes to be fetched may be determined based on performance considerations. To reduce the number of fetch requests to the remote machine, more nodes than needed may be sent in response to each fetch request. Although the nodes to be displayed may be a contiguous set of nodes within the ordered list of nodes of the hierarchy, additional nodes, that are next to the contiguous set of nodes to display, may be prefetched. If the list of nodes in the resulting display window is scrolled, then the pre-fetched nodes may already be in the cache. Pre-fetching may be performed when retrieving the additional nodes would not have an adverse impact on performance. That number may be determined experimentally and configured into the system. Alternatively, that number may be based on a current load, and may change dynamically over time.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 3:
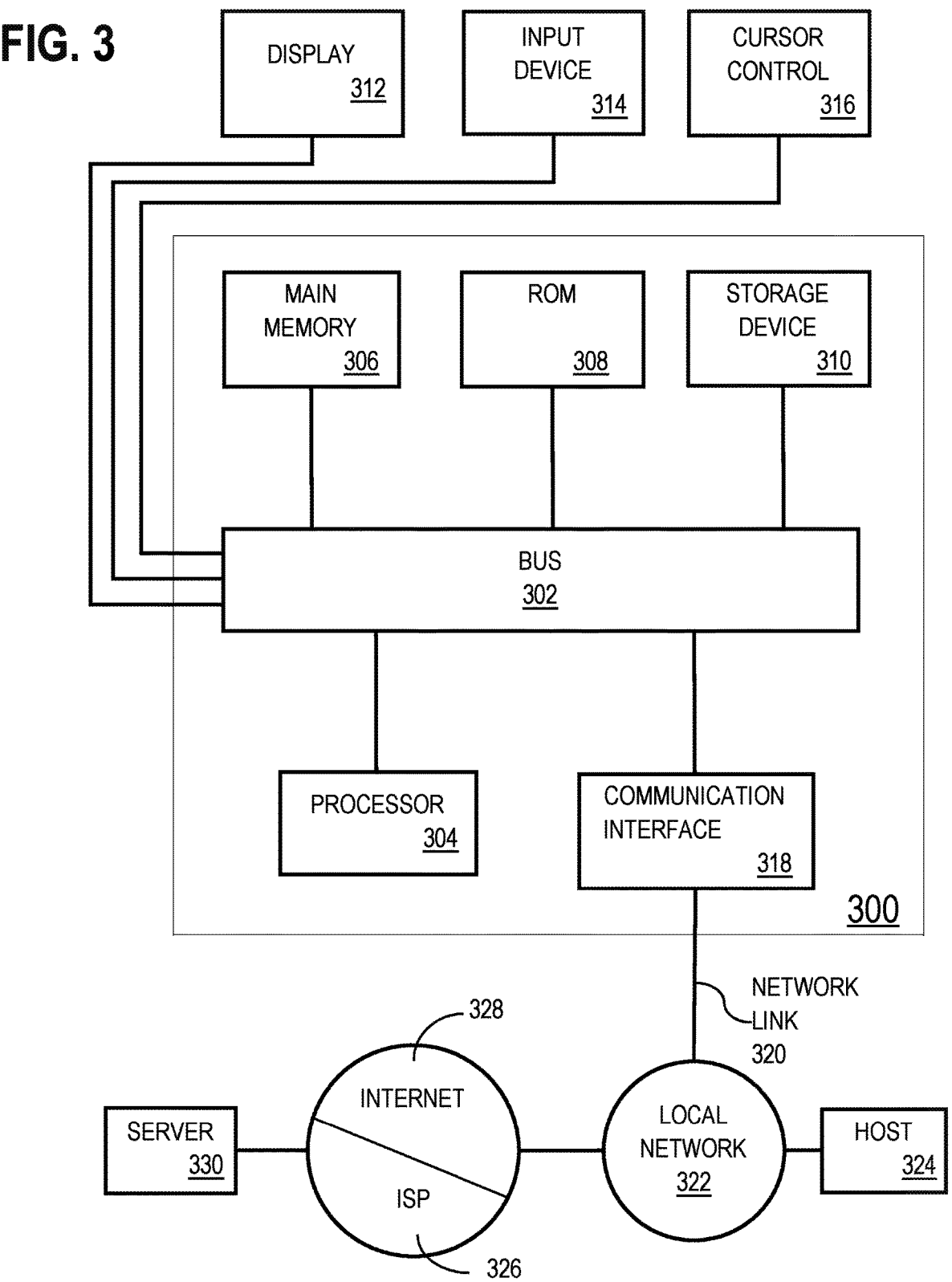
FIG. 3 shows a block diagram that illustrates a computer system in accordance with one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media storing instructions which, when executed by one or more hardware processors, cause:
   displaying, in a display window, a first subset of nodes in a first section of a hierarchical tree of nodes, the hierarchical tree of nodes on a remote machine;
   receiving a request for displaying a target node in the hierarchical tree of nodes, the target node not being displayed when the request is received;
   determining a configuration corresponding to the display window;
   determining a number of nodes to be displayed with the target node based on the configuration corresponding to the display window;
   analyzing the hierarchical tree of nodes to identify a second subset of nodes, corresponding to the number of nodes, in the hierarchical tree of nodes based on relationships between the target node and each of the nodes of the second subset of nodes in the hierarchical tree of nodes;
   determining that (a) a second section of the hierarchical tree is to be displayed in the display window when displaying the target node, the second section comprising the target node and the second subset of nodes in the hierarchical tree of nodes and (b) a third section of the hierarchical tree is not to be displayed in the display window when displaying the target node and the second subset of nodes, the third section comprising a third subset of nodes in the hierarchical tree of nodes;
   responsive to determining that the second section is to be displayed in the display window when displaying the target node and that the third section is not to be displayed when displaying the target node:
      fetching, from the remote machine, the target node and the second subset of nodes comprised in the second section of the hierarchical tree of nodes, without fetching the third subset of nodes comprised in the third section of the hierarchical tree of nodes; and
      concurrently displaying the target node and the second subset of nodes, corresponding to the number of nodes to be displayed with the target node, in the second section of the hierarchical tree of nodes, without displaying the third subset of nodes in the third section of the hierarchical tree of nodes.

2. The media of claim 1, wherein the instructions further cause:
   fetching one or more ancestor nodes of the target node, wherein the one or more ancestor nodes have not been fetched from the remote machine and are not displayed with the target node in the second section of the hierarchical tree of nodes.

3. The media of claim 1, wherein the instructions further cause:
   maintaining a second hierarchy of cached nodes, wherein each cached node in the second hierarchy of cached nodes corresponds to a node in the hierarchical tree of nodes on the remote machine, and the hierarchical tree of nodes on the remote machine contains nodes that are not represented in the second hierarchy of cached nodes;
   caching, in the second hierarchy of cached nodes, a particular node of the one or more nodes fetched from the remote machine; and
   responsive to determining that the particular node is an internal node having a child node that is not cached in the second hierarchy of cached nodes, creating a placeholder in association with the particular node, the placeholder indicating that the child node is missing from the second hierarchy of cached nodes.

4. The media of claim 3, wherein:
   the particular node has an ordered sequence of child nodes, and a plurality of child nodes that are contiguous in the ordered sequence of child nodes are not cached, and
   the placeholder created in association with the particular node indicates that the plurality of contiguous child nodes in the ordered sequence of child nodes is missing from the second hierarchy of cached nodes.

5. The media of claim 3, wherein caching the particular node of the one or more nodes fetched from the remote machine further comprises:
   setting a value of an expansion state indicator for the particular node to a default value, wherein:
      a value that indicates that the state of the particular node is expanded causes child nodes of the particular node to be displayed contiguous to the particular node; and a value that indicates that the state of the particular node is collapsed causes the particular node to be displayed without displaying child nodes of the particular node.

6. The media of claim 3, wherein the instructions further cause:
receiving a request to expand all nodes in the hierarchical tree of nodes;
responsive to receiving the request to expand all nodes in the hierarchical tree of nodes, setting a value of a global expansion state indicator to indicate that all nodes representing nodes in the hierarchical tree of nodes are to be displayed as expanded;
determining when the request is received that a displayed node is being displayed and child nodes of the displayed node are not being displayed;
fetching one or more child nodes of the displayed node that are missing from the cache without fetching child nodes of other nodes that are not being displayed;
changing the displayed nodes to include a portion of the child nodes of the particular node; and
adding the fetched one or more child nodes to the second hierarchy of cached nodes.

7. The media of claim 3, wherein the instructions further cause:
prior to fetching, determining the one or more nodes to fetch based on:
(a) cached nodes in the second hierarchy of cached nodes;
(b) a determined number of nodes in the hierarchical tree of nodes to pre-fetch; and
(c) an expansion state indicator for nodes to be displayed with the target node.

8. The media of claim 3, wherein the remote machine responds to requests for nodes in the hierarchical tree of nodes without tracking:
(a) which nodes have been sent to the requester or
(b) state of the second hierarchy of cached nodes maintained by the requester.

9. The media of claim 1, wherein:
each node in the hierarchical tree of nodes has an ordered sequence of zero or more child nodes, wherein one or more child nodes of the ordered sequence of child nodes are displayed in order of their sequence; and
determining that one or more nodes of the first subset of nodes is to be displayed with the target node further comprises:
generating an ordered list of nodes that include the target node, wherein child nodes of unexpanded nodes are omitted from the ordered list of nodes; and
selecting contiguous nodes in the ordered list of nodes, wherein:
the selected contiguous nodes includes the target node; and
the number of contiguous nodes is based on the number of nodes that can be displayed together.

10. The media of claim 1, wherein the fetching further comprises fetching a fourth subset of nodes that are adjacent to the second subset of nodes in the hierarchical tree of nodes, wherein the fourth subset of nodes is not displayed with the target node.

11. The media of claim 1, wherein the instructions further cause:
maintaining a second hierarchy of cached nodes, wherein each cached node in the second hierarchy of cached nodes corresponds to a node in the hierarchical tree of nodes on the remote machine, and the hierarchical tree of nodes on the remote machine contains nodes that are not represented in the second hierarchy of cached nodes;
wherein the remote machine responds to requests to fetch nodes in the hierarchical tree of nodes without tracking:
(a) which nodes have been sent to the requester or
(b) state of the second hierarchy of cached nodes maintained by the requester;
caching the target node in the second hierarchy of cached nodes;
responsive to determining that the target node is an internal node having an ordered sequence of child nodes, and a plurality of child nodes that are contiguous in the ordered sequence of child nodes are not cached in the second hierarchy of cached nodes, creating a placeholder in association with the target node, the placeholder indicating that the plurality of child nodes are missing from the second hierarchy of cached nodes;
upon caching the target node, setting, for the target node, a value of an expansion state indicator for the target node to a default value of expanded or collapsed, wherein at least one child node of the target node is displayed in the display window with the target node when the expansion state indicator has a value of expanded, and no child node is displayed in the display window with the target node when the expansion state indicator has a value of collapsed;
wherein the nodes in the second subset of nodes is determined based on:
(a) cached nodes in the second hierarchy of cached nodes;
(b) a determined number of nodes in the hierarchical tree of nodes to pre-fetch; and
(c) the expansion state indicator for the target node;
wherein each node in the hierarchical tree of nodes has an ordered sequence of zero or more child nodes;
generating an ordered list of nodes that include the target node followed by the ordered sequence of zero or more child nodes when the expansion state indicator for the target node has a value of expanded; wherein the sequence of zero or more child nodes are omitted from the ordered list of nodes when the expansion state indicator for the target node has a value of collapsed;
selecting for display a set of contiguous nodes in the ordered list of nodes, wherein:
the selected contiguous nodes includes the target node; and
the number of contiguous nodes is based on the number of nodes that can be displayed together;
displaying the selected set of contiguous nodes;
receiving a request to expand all nodes in the hierarchical tree of nodes;
responsive to receiving the request to expand all nodes in the hierarchical tree of nodes:
setting a value of a global expansion state indicator associated with the second hierarchy of cached nodes to indicate that all nodes in the hierarchical tree of nodes are to be displayed as expanded;
determining that the ordered list of nodes includes a displayed node having child nodes that were omitted from the ordered list of nodes based on the expansion state indicator of the displayed node having a collapsed value;
fetching one or more child nodes of the displayed node that are missing from the cache without fetching child nodes of other nodes that are not being displayed;

adding the fetched one or more child nodes to the second hierarchy of cached nodes; and
changing the display in the display window to include a portion of the fetched one or more child nodes of the displayed node.

12. The media of claim 1, wherein the configuration corresponding to the display window comprises one or more of: a size of the display window, a resolution of the display window, a size of node illustration in the tree of nodes, and an amount of space between node illustrations in the tree of nodes.

13. A method comprising:
displaying, in a display window, a first subset of nodes in a first section of a hierarchical tree of nodes, the hierarchical tree of nodes on a remote machine;
receiving a request for displaying a target node in the hierarchical tree of nodes, the target node not being displayed when the request is received;
determining a configuration corresponding to the display window;
determining a number of nodes to be displayed with the target node based on the configuration corresponding to the display window;
analyzing the hierarchical tree of nodes to identify a second subset of nodes, corresponding to the number of nodes, in the hierarchical tree of nodes based on relationships between the target node and each of the nodes of the second subset of nodes in the hierarchical tree of nodes;
determining that (a) a second section of the hierarchical tree is to be displayed in the display window when displaying the target node, the second section comprising the target node and the second subset of nodes in the hierarchical tree of nodes and (b) a third section of the hierarchical tree is not to be displayed in the display window when displaying the target node and the second subset of nodes, the third section comprising a third subset of nodes in the hierarchical tree of nodes;
responsive to determining that the second section is to be displayed in the display window when displaying the target node and that the third section is not to be displayed when displaying the target node:
fetching, from the remote machine, the target node and the second subset of nodes comprised in the second section of the hierarchical tree of nodes, without fetching the third subset of nodes comprised in the third section of the hierarchical tree of nodes; and
concurrently displaying the target node and the second subset of nodes, corresponding to the number of nodes to be displayed with the target node, in the second section of the hierarchical tree of nodes, without displaying the third subset of nodes in the third section of the hierarchical tree of nodes.

14. The method of claim 13, further comprising:
fetching one or more ancestor nodes of the target node, wherein the one or more ancestor nodes have not been fetched from the remote machine and are not displayed with the target node in the second section of the hierarchical tree of nodes.

15. The method of claim 13, further comprising:
maintaining a second hierarchy of cached nodes, wherein each cached node in the second hierarchy of cached nodes corresponds to a node in the hierarchical tree of nodes on the remote machine, and the hierarchical tree of nodes on the remote machine contains nodes that are not represented in the second hierarchy of cached nodes;

caching, in the second hierarchy of cached nodes, a particular node of the one or more nodes fetched from the remote machine; and
responsive to determining that the particular node is an internal node having a child node that is not cached in the second hierarchy of cached nodes, creating a placeholder in association with the particular node, the placeholder indicating that the child node is missing from the second hierarchy of cached nodes.

16. The method of claim 15, wherein:
the particular node has an ordered sequence of child nodes, and a plurality of child nodes that are contiguous in the ordered sequence of child nodes are not cached, and
the placeholder created in association with the particular node indicates that the plurality of contiguous child nodes in the ordered sequence of child nodes is missing from the second hierarchy of cached nodes.

17. The method of claim 15, wherein caching the particular node of the one or more nodes fetched from the remote machine further comprises: setting the value of an expansion state indicator to a default value, wherein:
a value that indicates that the state of the particular node is expanded causes child nodes of the particular node to be displayed contiguous to the particular node; and
a value that indicates that the state of the particular node is collapsed causes the particular node to be displayed without displaying child nodes of the particular node.

18. The method of claim 15, further comprising:
receiving a request to expand all nodes in the hierarchical tree of nodes;
responsive to receiving the request to expand all nodes in the hierarchical tree of nodes, setting a value of a global expansion state indicator to indicate that all nodes representing nodes in the hierarchical tree of nodes are to be displayed as expanded;
the value of the expansion state indicator to expanded in all cached nodes of the second hierarchy of cached nodes;
determining when the request is received that a displayed node is being displayed and child nodes of the displayed node are not being displayed;
fetching one or more child nodes of the displayed node that are missing from the cache without fetching child nodes of other nodes that are not being displayed;
changing the displayed list of nodes to include a portion of the child nodes of the particular node; and
adding the fetched one or more child nodes to the second hierarchy of cached nodes.

19. The method of claim 15, wherein the remote machine responds to requests for nodes in the hierarchical tree of nodes without tracking:
(a) which nodes have been sent to the requester or
(b) state of the second hierarchy of cached nodes maintained by the requester.

20. A system comprising:
at least one hardware device including a processor; and
the system configured to perform:
displaying, in a display window, a first subset of nodes in a first section of a hierarchical tree of nodes, the hierarchical tree of nodes on a remote machine;
receiving a request for displaying a target node in the hierarchical tree of nodes, the target node not being displayed when the request is received;
determining a configuration corresponding to the display window;

determining a number of nodes to be displayed with the target node based on the configuration corresponding to the display window;

analyzing the hierarchical tree of nodes to identify a second subset of nodes, corresponding to the number of nodes, in the hierarchical tree of nodes based on relationships between the target node and each of the nodes of the second subset of nodes in the hierarchical tree of nodes;

determining that (a) a second section of the hierarchical tree is to be displayed in the display window when displaying the target node, the second section comprising the target node and the second subset of nodes in the hierarchical tree of nodes and (b) a third section of the hierarchical tree is not to be displayed in the display window when displaying the target node and the second subset of nodes, the third section comprising a third subset of nodes in the hierarchical tree of nodes;

responsive to determining that the second section is to be displayed in the display window when displaying the target node and that the third section is not to be displayed when displaying the target node:

fetching, from the remote machine, the target node and the second subset of nodes comprised in the second section of the hierarchical tree of nodes, without fetching the third subset of nodes comprised in the third section of the hierarchical tree of nodes; and concurrently displaying the target node and the second subset of nodes, corresponding to the number of nodes to be displayed with the target node, in the second section of the hierarchical tree of nodes, without displaying the third subset of nodes in the third section of the hierarchical tree of nodes.

* * * * *